(12) United States Patent
Okumura

(10) Patent No.: US 7,889,237 B2
(45) Date of Patent: Feb. 15, 2011

(54) DIGITAL CAMERA

(75) Inventor: Yoichiro Okumura, Hino (JP)

(73) Assignee: Olympus Imaging Corp., Tokyo (JP)

( * ) Notice: Subject to any disclaimer, the term of this patent is extended or adjusted under 35 U.S.C. 154(b) by 546 days.

(21) Appl. No.: 11/960,541

(22) Filed: Dec. 19, 2007

(65) Prior Publication Data

US 2008/0151062 A1 Jun. 26, 2008

(30) Foreign Application Priority Data

Dec. 20, 2006 (JP) .............................. 2006-343083

(51) Int. Cl.
*H04N 5/228* (2006.01)
*H04N 5/262* (2006.01)
*H04N 5/222* (2006.01)
*G06K 9/32* (2006.01)

(52) U.S. Cl. .............................. 348/208.5; 348/208.99; 348/208.4; 348/240.99; 348/333.11; 382/294; 382/298

(58) Field of Classification Search .............. 348/208.1, 348/208.2, 208.5, 208.6, 208.7, 208.16, 333.11, 348/333.12, 240.99, 208.13; 382/294, 103, 382/107, 295, 296, 298, 284
See application file for complete search history.

(56) References Cited

U.S. PATENT DOCUMENTS

| | | | | |
|---|---|---|---|---|
| 5,502,484 A | * | 3/1996 | Okada ..................... | 348/208.6 |
| 6,630,950 B1 | * | 10/2003 | Ohkawara et al. ...... | 348/208.12 |
| 6,963,361 B1 | * | 11/2005 | Kawahara et al. ...... | 348/208.99 |
| 6,985,177 B2 | * | 1/2006 | Takahashi et al. ...... | 348/208.99 |
| 7,502,050 B2 | * | 3/2009 | Hatanaka et al. ......... | 348/208.3 |
| 2007/0097219 A1 | * | 5/2007 | Nomura et al. .......... | 348/208.7 |

FOREIGN PATENT DOCUMENTS

| | | |
|---|---|---|
| CN | 1096622 | 12/1994 |
| CN | 1719329 | 1/2006 |
| JP | 06-046322 | 2/1994 |
| JP | 2002-369042 | 12/2002 |
| JP | 2006-23631 | 1/2006 |

OTHER PUBLICATIONS

First Office Action for Chinese Patent Application No. 2007101608137, mailed Jun. 19, 2009 (5 pgs.).

* cited by examiner

*Primary Examiner*—Lin Ye
*Assistant Examiner*—Marly Camargo
(74) *Attorney, Agent, or Firm*—Straub & Pokotylo; John C. Pokotylo

(57) ABSTRACT

A digital camera, comprising a live view display section for repeatedly acquiring a subject image, cropping and enlarging part of the subject image, and displaying as a moving image, a vibration detection section for detecting vibration of the digital camera and calculating at least one of vibration direction and vibration amount, and a control section for, when part of the moving image is enlarged and displayed, controlling cropping position and size for the moving image to be displayed on the live view section according to output of the vibration detection section, or, when displaying the whole of the moving image, controlling shift of an image sensor or part of a lens according to output of the vibration detection section.

5 Claims, 8 Drawing Sheets

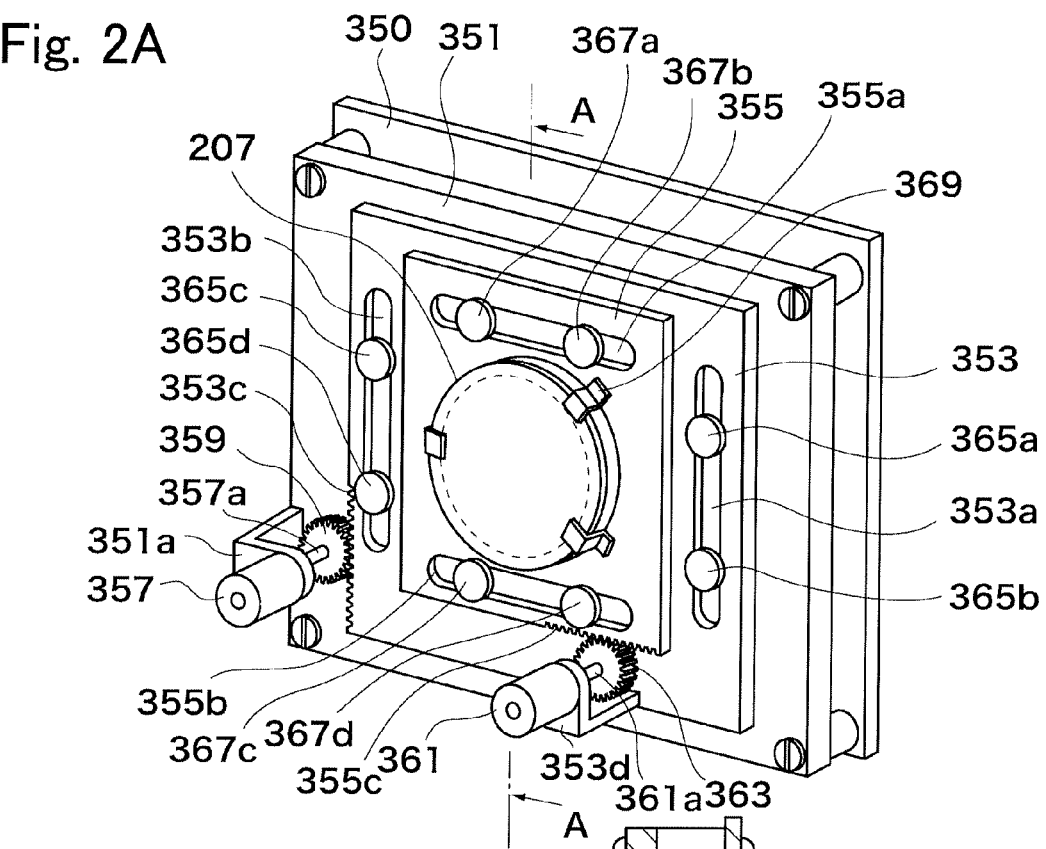
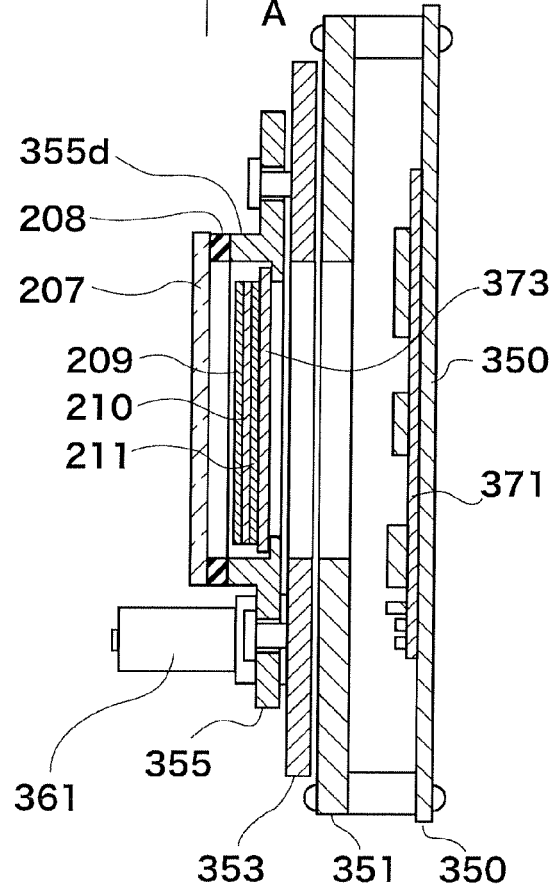
Fig. 2A
Fig. 2B

DIGITAL CAMERA

Benefit is claimed, under 35 U.S.C. §119, to the filing date of prior Japanese Patent Application No. 2006-343083, filed on Dec. 20, 2006. This application is expressly incorporated herein by reference. The scope of the present invention is not limited to any requirements of the specific embodiments described in the application.

BACKGROUND OF THE INVENTION

1. Field of the Invention

The present invention relates to a digital camera, and in detail relates to a digital camera having a live view display function and a image stabilization function.

2. Description of the Related Art

If a camera is shaken due to hand shake of the photographer, it has the effect of causing unattractive images. Various digital cameras having a vibration correction unit have therefore been proposed in order to mitigate the effects of camera vibration such as hand shake. For example, Japanese unexamined patent application No. Hei. 6-046322 (laid-open Feb. 18, 1994) discloses an image-taking device with a vibration control function unit for alleviating vibration by causing an image sensor to move within a plane orthogonal to the optical axis of a photographing lens in accordance with output from a vibration detection sensor.

It is also known to live view display an image on a display unit such as liquid crystal used for subject viewing instead of an optical viewfinder or together with an optical viewfinder (also called electronic viewfinder display), using output of the image sensor (for acquiring a subject image) of the digital camera. For example, Japanese unexamined patent application No. 2002-369042 (laid-open Dec. 20, 2002) discloses a digital single lens reflex camera that performs live view display using an image acquired by opening a focal plane shutter arranged between the photographing lens and the image sensor.

SUMMARY OF THE INVENTION

The present invention has been conceived in view of the above-described situation, and an object of the invention is to provide a digital camera capable of live view display with reduced effect of vibration on an image, and with reduced power consumption.

A digital camera of the present invention comprises a live view display section for repeatedly acquiring a subject image, cutting and enlarging part of the subject image, and displaying as a moving image, a vibration detection section for detecting vibration of the digital camera and calculating at least one of vibration direction and vibration amount, and a control section for, when part of the moving image is enlarged and displayed, controlling cropping position and size for the moving image to be displayed on the live view section according to output of the vibration detection section, or, when displaying the whole of the moving image, controlling shift of an image sensor or part of a photographing lens according to output of the vibration detection section.

BRIEF DESCRIPTION OF THE DRAWINGS

FIG. 2A is an external perspective view showing the structure of an image sensor unit and a shift mechanism of a first embodiment of the present invention, and FIG. 2B is a cross sectional drawing along line A-A of the image sensor unit and the shift mechanism.

DETAILED DESCRIPTION OF THE PREFERRED EMBODIMENTS

Figure 1:
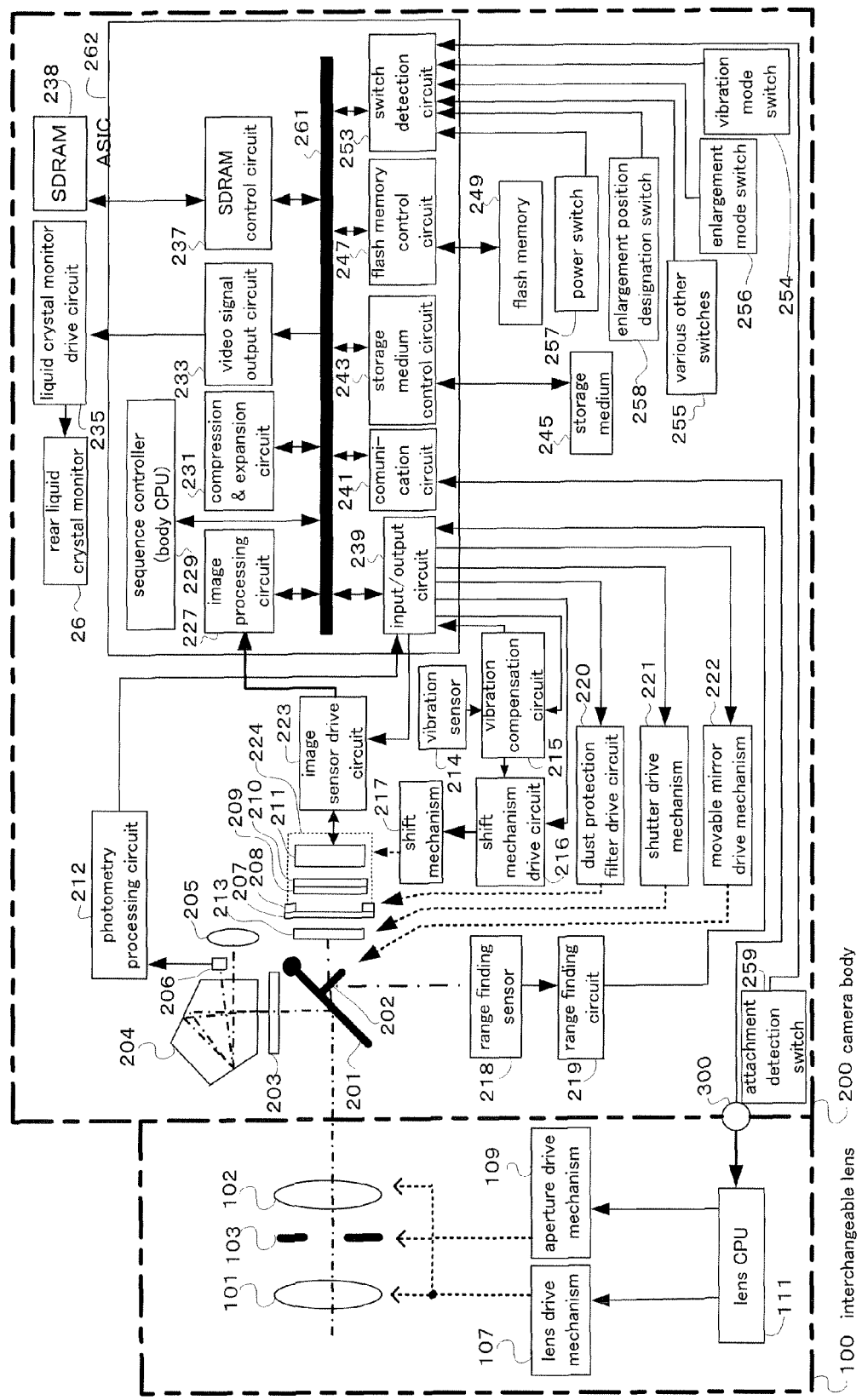
FIG. 1 is a block diagram showing the overall structure of a digital single lens reflex camera relating to a first embodiment of the present invention.

In the following, a preferred first embodiment using a digital single lens reflex adopting the present invention will be described using the drawings. FIG. 1 is a block diagram showing the overall structure of a digital single lens reflex camera relating to a first embodiment of the present invention, concentrating on electrical systems. This digital camera has a live view function to produce a subject image, formed using a photographing lens, on an image sensor, and display the image as a subject viewed on a display unit such as liquid crystal display, based on output of the image sensor. It is also possible to acquire still images in accordance with photographing instructions from the photographer, and store the still image in a storage medium. Further, vibration applied to the digital camera is detected and the camera has a vibration prevention function using a mechanical vibration compensation mechanism to move the image sensor so as to negate this vibration, and a vibration prevention function using electronic vibration compensation to subject image signals to image processing so as to negate the vibration. There is also a dust reduction function that uses vibrational waves.

The digital single lens reflex camera relating to this embodiment comprises an interchangeable lens 100 and a camera body 200. With this embodiment, the interchangeable lens 100 and the camera body 200 are constructed as separate bodies, electrically connected by means of a communication contact 300, but it is also possible to integrally construct the interchangeable lens 100 and the camera body 200.

Lenses 101 and 102 for focusing and focal length adjustment, and an aperture 103 for adjusting aperture are arranged inside the interchangeable lens 100. The lenses 101 and 102 are driven by a lens drive mechanism 107, while the aperture 103 is driven by the aperture drive mechanism 109. The lens drive mechanism 107 and the aperture drive mechanism 109 are respectively connected to a lens CPU 111, and this lens CPU 111 is connected to the camera body 200 by means of the communication contact 300. The lens CPU 111 performs control inside of the interchangeable lens 100, controls the lens drive mechanism 107 to perform automatic focusing and zoom operations, and controls an aperture value by controlling the aperture drive mechanism 109.

Inside the camera body 200, a rotatable moving reflector mirror 201 is provided moving between a position inclined by 45 degrees with respect to the lens optical axis for reflecting a subject image to a viewfinder optical system, and a raised up position for guiding the subject image to the image sensor 211. A focusing screen 203 for image forming the subject image is arranged above this moving reflector mirror 201, and a pentaprism 204 for lateral inversion of the subject image is arranged above this focusing screen 203.

An ocular lens 205 for viewing the subject image is arranged at an outgoing side of this pentaprism 204 (the right side in FIG. 1), and a photosensor 206 is arranged next to the ocular lens at a position that does not obstruct viewing of the subject image. This photosensor 206 is constructed of an area with multiple photosensors for splitting the subject image and performing light measurements. Output of the photosensor 206 is connected to a photometry processing circuit 212, and the photometry processing circuit 212 outputs a subject brightness signal based on output of the photosensor 206.

A half mirror is constructed close to the middle of the moving reflector mirror 201, and a sub-mirror 202 for reflecting the subject image that has passed through the half mirror to a lower section of the camera body 200 is provided on a rear surface of this moving reflector mirror 201. This sub mirror 202 is capable of rotation with respect to the moving reflector mirror 201, and when the moving reflector mirror 201 is raised up the sub mirror 202 rotates to a position covering the half mirror part, while when the moving reflector mirror 201 is in a subject image viewing position the sub-mirror 202 is at a position opened with respect to the moving reflector mirror 201, as shown in the drawing. A movable mirror drive mechanism 222 drives the moving reflector mirror 201.

Also, a range finding sensor 218 is arranged below the sub-mirror 202, and output of this range finding sensor 218 is connected to a range finding circuit 219. It is possible to measure defocus amount of the subject image formed by the lenses 101 and 102 using the range finding sensor 218 and the range finding circuit 219. Specifically, defocus amount is detected by ranging with a well-known TTL phase difference method, using light passing through the lenses 101 and 102.

A focal plane type shutter 213 for exposure time control is arranged behind the moving reflector mirror 201, and a shutter drive mechanism 221 drives the shutter 213. An image sensor 211 is arranged behind the shutter 213, and a subject image formed by the lenses 101 and 102 is photoelectrically converted into electrical signals. It is possible to use a two-dimensional imaging element such as a CCD (Charge Coupled Device), or a CMOS (Complementary Metal Oxide Semiconductor) as the image sensor 211. A dust protection filter 207 constituting a dust protection mechanism, and a piezoelectric element 208 fixed to peripheral edges of this dust protection filter 207 are arranged between the shutter 213 and the image sensor 211. A dust protection filter drive circuit 220 drives the piezoelectric element 208.

An optical low pass filter 209 for cutting high frequency components of the subject image and passing only low frequencies, and an infrared cut filter 210 for cutting an infrared component, are arranged between the dust protection filter 207 and the image sensor 211. These components, namely the dust protection filter 207, piezoelectric element 208, low pass filter 209, infrared cut filter 210 and image sensor 211, constitute an image sensor unit 224, and this image sensor unit 224 is constructed so that gaps become small so that it is difficult for dust etc. to penetrate. The image sensor unit 224 is capable of movement within a plane orthogonal to the optical axes of the lenses 101 and 102 constituting the photographing lens, by a shift mechanism 217.

Output of a vibration detection sensor 214 for detecting vibration applied to the camera body 200 is connected to a vibration compensation circuit 215. This vibration compensation circuit 215 outputs control signals to an input/output circuit 239, and also outputs vibration compensation signals to a shift mechanism drive circuit 216 and the input /output circuit 239. Vibration compensation signals input to the input/output circuit 239 are sent via a data bus 261 to an image processing circuit 227.

Also, the shift mechanism 217 drives the image sensor unit 224 using an actuator inside the shift mechanism drive circuit 216 that has been inputted with the vibration compensation signals. Accordingly, based on the output of the vibration sensor 214, the vibration compensation circuit 215 outputs drive signals to the shift mechanism drive circuit 216 so as to negate vibrational movement, and the shift mechanism 217 moves the image sensor unit 224 using actuators inside the shift mechanism drive circuit 216. The shift mechanism 217 can move the image sensor unit 224 in a first direction within a plane orthogonal to the image optical axis, and a second direction orthogonal to this first direction. The image sensor unit 224, shift mechanism 217 and shift mechanism drive circuit 216 will be described in detail later using FIG. 2A and FIG. 2B and FIG. 3.

The image sensor 211 is connected to an image sensor drive circuit 223, and is drive controlled by control signals from the input/output circuit 239. The image sensor drive circuit 223 amplifies photoelectric analog signals output from the image sensor 221, and subjects these signals to analog to digital conversion (AD conversion). The image sensor drive circuit 223 is connected to an image processing circuit 227 inside an ASIC (Application specific integrated circuit) 262, and this image processing circuit 227 performs various image processing such as digital amplification of digital image data (digital gain adjustment processing), color correction, gamma (γ) correction, contrast correction, monochrome/color mode processing, and live view image processing. The image processing circuit 227 also performs electronic vibration compensation for eliminating vibration applied to the camera, using well-known image processing for changing a crop position of image data that has been AD converted, based on vibration compensation signals.

The image processing circuit 227 is connected to a data bus 261. Besides the image processing circuit 227, components that will be described later, such as a sequence controller (hereafter referred to as a body CPU) 229, compression and expansion circuit 231, video signal output circuit 233, SDRAM control circuit 237, input/output circuit 239, communication circuit 241, storage medium control circuit 243, flash memory control circuit 247 and switch sensing circuit 253, are connected to this data bus 261.

The body CPU 229 that is connected to the data bus 261 is for controlling operation of this digital camera. Also, the compression and expansion circuit 231 connected to the data bus 261 is a circuit for compressing image data stored in the SDRAM 238 in compression formats used for still images, such as JPEG, etc. and expanding the compressed data at the time of image playback. The image compression is not limited to JPEG, and it is also possible to apply other compression methods. The video signal output circuit 233 connected to the data bus 261 is connected to a rear liquid crystal monitor 26 via a liquid crystal monitor drive circuit 235. The video signal output circuit 233 is for converting image data stored in the SDRAM 238 or the storage medium 245 into video signals for display on the rear liquid crystal monitor 26.

The rear liquid crystal monitor 26 is arranged on the rear surface of the camera body 200, but as long as it is in a position that can be seen by the photographer it is not limited to the rear surface, and also is not limited to liquid crystal and can be another display device. The SDRAM 238 is connected to the data bus 261 via an SDRAM control circuit 237. This SDRAM 238 is a buffer memory for temporarily storing image data that has been subjected to image processing by the image processing circuit 227 or image data that has been compressed by the compression and expansion circuit 231.

The input/output circuit 239 connected to the above-described photometry processing circuit 212, vibration compensation circuit 215, shift mechanism drive circuit 216, ranging circuit 219, dust protection filter drive circuit 220, shutter drive mechanism 221, movable mirror drive mechanism 222, and image sensor drive circuit 223 controls input and output of data to various circuits, such as the body CPU 229 via the data bus 261. The communication circuit 241 that is connected to the lens CPU 111 via the communication contact 300 is also connected to the data bus 261, and carries out data transfer with the body CPU 229 etc. and communication for control commands.

The storage medium control circuit 243 connected to the data bus 261 is connected to the storage medium 245, and stores image data etc., in this storage medium 245. The storage medium 245 is constructed so that any rewritable storage medium, such as xD picture card (registered trademark), compact Flash (registered trademark), SD memory card (registered trademark) or memory stick (registered trademark) can be fitted, and is removably inserted into the camera body 200. Besides this, it is also possible to have a structure capable of connecting a hard disk unit, such as a microdrive (registered trademark) or a wireless communication unit.

A flash memory control circuit 247 connected to the data bus 261 is connected to a flash memory 249, and this flash memory 249 stores programs for controlling camera operations. The body CPU 229 performs control of the digital camera in accordance with the programs stored in the flash memory 249. Incidentally, the flash memory 249 is an electrically rewritable non-volatile memory.

Various switches 255, including a power switch 257 for turning the camera on and off, linking to a power switch lever for controlling supply of power to the camera body 200 and the lens 100, a switch linking to the shutter release button, a switch linking to the playback button for instructing playback mode, a switch linking to a cross-shaped button for instructing movement of a cursor on the screen of the rear liquid crystal monitor 26, a switch linking to a display switching button for carrying out switching of live view display, a switch linking to the mode dial for instructing exposure modes, an OK switch linking to the OK button for deciding various selected modes etc. and a dust protection switch, and switches such as a vibration mode switch 254, an enlargement mode switch 256, an enlargement position designating switch 258 and an attachment detection switch 259, are connected to the data bus 261 via a switch sensing circuit 253.

Incidentally, the release button has a first release switch that turns on if the photographer presses the button down halfway, and a second release switch that is turned on when the button is pressed down fully. The camera carries out exposure preparation operations, such as focal point detection, focusing of the photographing lens, and light measurements for the subject brightness, as a result of this first release switch (hereafter called 1R) being turned on, and if the second switch (hereafter called 2R) is turned on, an exposure operation is carried out to acquire image data for a subject image based on output of an image sensor.

Also, the dust protection switch is a switch linking to a dust protection button that is operated when the user instructs a dust removal operation. The vibration mode switch 254 is a switch for starting the vibration compensation operation, the enlargement mode switch 256 is a switch for enlarging a live view display at the time of live view display, and the enlargement position designation switch 258 is a switch for designating an enlargement position for the enlargement mode. It is also possible for the enlargement position designation switch 258 to be combined with a switch linking to a cross-shaped button. Also, the attachment detection switch 259 is a switch for detecting whether or not the interchangeable lens 100 is attached to the camera body 200.

Next, the structure of the image sensor unit 224 and shift mechanism 217 will be described using FIG. 2A and FIG. 2B. FIG. 2A is a perspective drawing of the image sensor unit 224 and the shift mechanism 217 seen from the shutter 213 side, and FIG. 2B is a cross section along line A-A. A first substrate 350 formed as a flat plate toughened electrical circuit substrate is fixed to the camera body 200. A main substrate 371 on which a control circuit such as the previously described ASIC 262 is mounted is fixed on the first substrate 350.

A second substrate 351 formed as a flat plate parallel to the first substrate 350 is fixed to a front surface side of the first substrate 350. Four pins 365a, 365b, 365c and 365d are provided on the second substrate 351. These four pins 365a, 365b, 365c and 365d are fitted into elongated holes 353a and 353b of the first slider 353, and the first slider 353 slides freely up and down. Specifically, the vertically aligned pins 365a and 365b are fitted into the elongated hole 353a, and the similarly vertically aligned pins 365c and 365d are fitted into the elongated hole 353b, and the first slider 353 slides vertically, but does not slide laterally.

Four pins 367a, 367b, 367c and 367d are provided on the first slider 353. The elongated holes 355a and 355b are fitted onto these four pins 367a, 367b, 367c and 367d, and the second slider 355 slides laterally. Specifically, the laterally aligned pins 367a and 367b are fitted into the elongated hole 355a, and the similarly laterally aligned pins 367c and 367d are fitted into the elongated hole 355b, and the second slider 355 slides laterally, but does not slide vertical.

A DC motor (hereafter referred to as a motor) 357, as an actuator for Y direction shift, is fixed to an L-shaped projecting section 351a at the left edge of the second substrate 351, and a drive shaft 357a of the motor 357 is integrally fixed to a drive gear 359. This drive gear 359 meshes with a spur gear 353c formed on a sidewall of the left edge section of the first slider 353, and a so-called rack and pinion is formed by the drive gear 359 and spur gear 353c. Therefore, if the motor 357 rotates, the drive gear 359 rotates, and the first slider 353 that is meshed with the drive gear 359 slides vertically. In FIG. 2A, only the drive gear 359 has been depicted as a gear in the drive power transmission system of the motor 357, but it goes without saying that a plurality of gears can be provided in order to reduce the speed of the motor 357.

A DC motor (hereafter referred to as a motor) 361, as an actuator for X direction shift, is fixed to an L-shaped projecting section 353d provided on the first slider 353, and a drive shaft 361a of the motor 361 is integrally fastened to a drive gear 363. This drive gear 363 meshes with a spur gear 355c, formed on a sidewall of the lower edge section of the second slider 355, and a so-called rack and pinion is formed by this drive gear 359 and spur gear 355c. Therefore, if the motor 361 rotates, the drive gear 363 rotates, and the second slider 355 that is meshed with the drive gear 363 slides laterally. Similarly to the case of the vertical drive, in FIG. 2A, only the drive gear 363 has been depicted as a gear in the drive power transmission system of the motor 361, but it goes without saying that a plurality of gears may be provided in order to reduce the speed of the motor 361.

An imaging substrate 373 is provided at an inner side of an opening section substantially in the center of the second slider 355. The image sensor 211 is fixed to this imaging substrate 373, with the infrared cut filter 210, and then the optical low pass filter 209, being arranged at a front surface side of the image sensor 211. Also, a piezoelectric element 208 is fixed to the attachment section 355d of the peripheral edge section of an opening section of the second slider 355, along the circumference of the opening section. The dust protection filter 207 is then arranged by means of a vibration transmission medium, not shown. The dust protection filter 207 is press fitted to the piezoelectric element 208 via the vibration transmission body using fasteners 369. A subject image formed by the lenses 101 and 102 passes through the dust protection filter 207, optical low pass filter 209 and infrared cut filter 210, and is formed on the image sensor 211.

Since the image sensor unit 224 and shift mechanism 217 are constructed in this way, if the motor 357 rotates, the first slider 353 is then capable of sliding up and down (Y direction) on the second substrate 351. Similarly, if the motor 361 rotates, the second slider 355 can slide laterally (X direction) on the first slider 353. That is, by respectively drive controlling the motor 357 and the motor 361, the second slider 355 fixing the image sensor 211 is capable of moving freely in the X direction and Y direction within a plane orthogonal to the imaging optical axis. Accordingly, based on the output of the vibration sensor 214, the vibration compensation circuit 215 outputs signals to the motor 357 and the motor 361 of the shift mechanism drive circuit 216 so as to negate vibration, and it is possible to spatially move the image sensor unit 211 and negate vibration. Also, the piezoelectric element 208 vibrates at a frequency that is higher than an audio frequency if a drive signal is received from the dust protection filter drive circuit 220, and by generating vibrational waves it is possible to remove dust that has become attached to the dust protection filter 207.

Within this embodiment, a driving range of the first slider 353 and the second slider 355 is a range determined by elongated holes 353a, 353b, 355a and 355b, and by pins 365a, 365b, 365c, 365d, 367a, 367b, 367c and 367d, but it is not limited to the configuration of these elongated holes and pins, and it is also possible, for example, to provide contact sections on the second substrate 351 and the first slider 353, or to provide contact sections on the first slider 353 and the second slider 355, so that there is movement between them. In this case, if the contact sections are provided on a movable member such as the first slider 353, there is a potential problem of adversely affecting the drive mechanism, and so it is preferable to provide the contact sections on fixed members.

Also, within this embodiment a DC motor 361 has been provided as an actuator for lateral direction sliding, and the DC motor 357 has been provided as an actuator for vertical direction sliding, but this is not limiting, and it is also possible to adopt stepping motors or ultrasonic motors. In the case of adopting a stepping motor, there is the advantage that it is possible to detect position moved to from a reference position by counting the number of applied pulses. Also, although the first slider 353 and the second slider 355 are in directions orthogonal to each other, this is not limiting and it is also possible to have a structure where they are respectively driven in a circular motion. Further, the shift mechanism 217 of the image sensor 211 has been constructed using a rack and pinion, but this is not limiting and it is also possible to use various structures, such as a shift mechanism using piezoelectric elements, for example.

Figure 3:
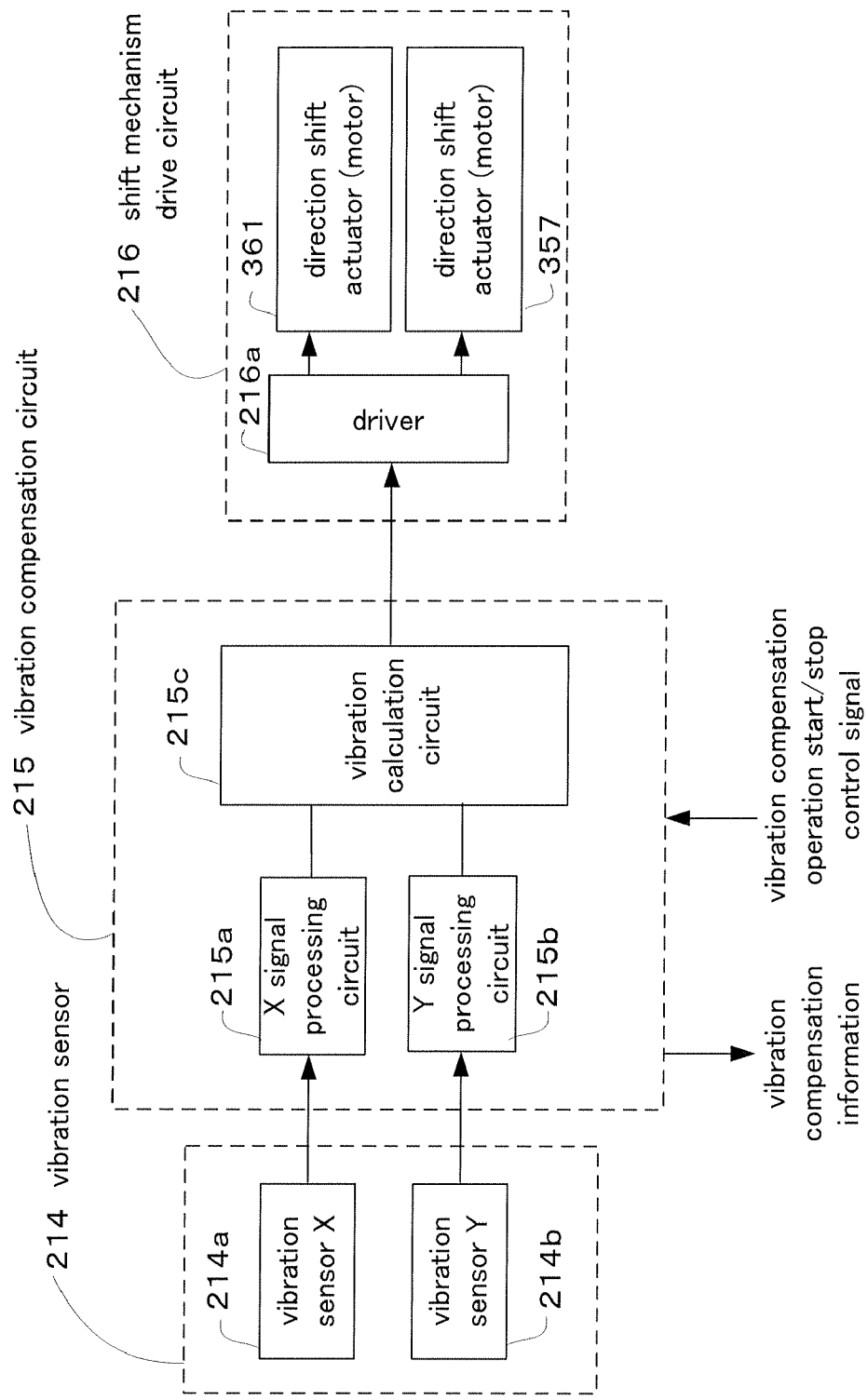
FIG. 3 is a block diagram showing detail of a vibration sensor, a vibration correction circuit and a shift mechanism drive circuit, of the first embodiment of the present invention.
Figure 4:
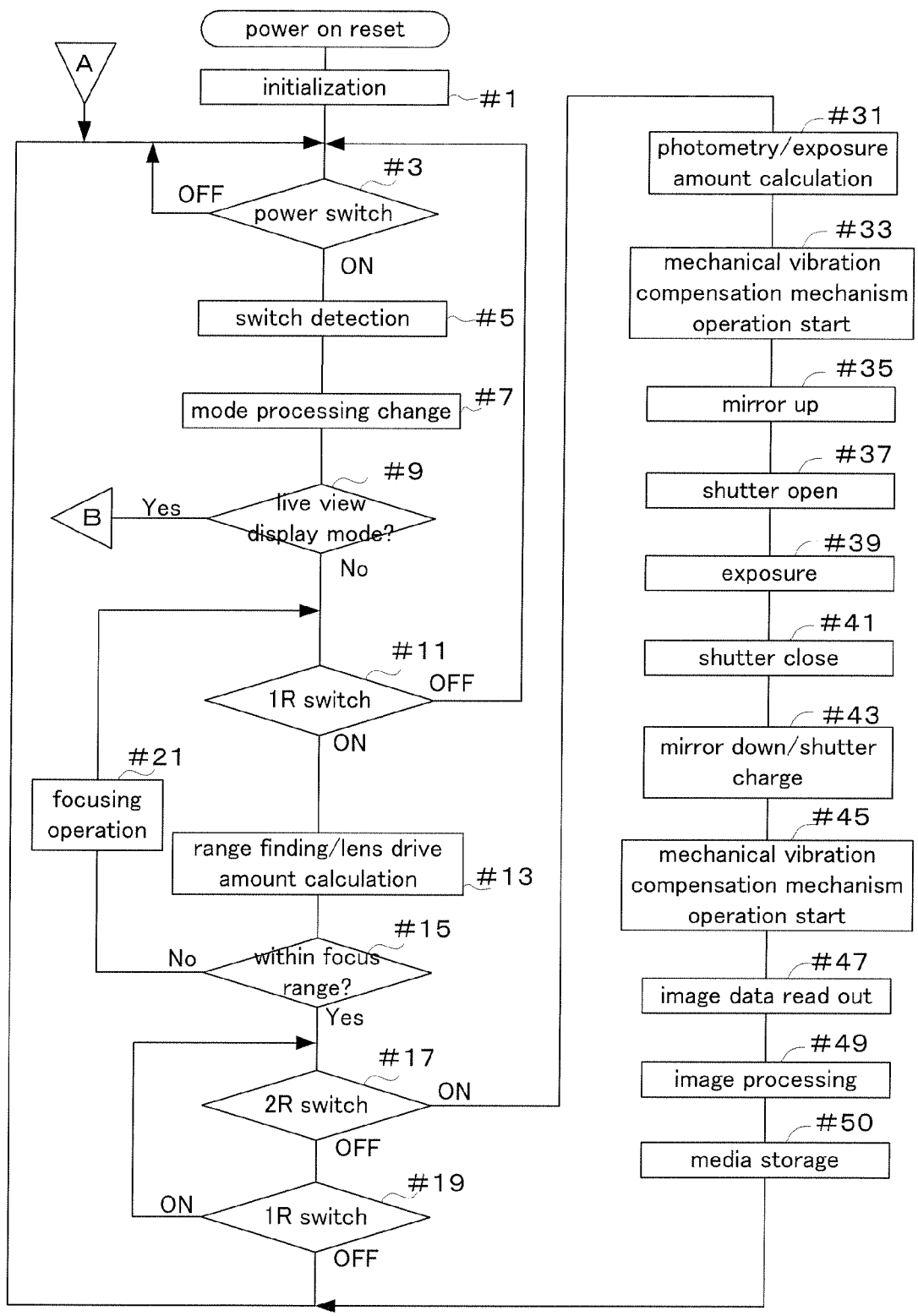
FIG. 4 is a flowchart showing power on reset in the first embodiment of the present invention.

Next, the structure of the vibration sensor 214, vibration compensation circuit 215 and shift mechanism drive circuit 216 will be described using FIG. 3. The vibration sensor 214 comprises a vibration sensor X 214a for detecting vibration in the lateral direction (X direction) of the camera body 200, as a first direction, and a vibration sensor Y 214b for detecting vibration in the vertical direction (Y direction) of the camera body 200, as a second direction. Here, the vibration sensors are constructed using well-known gyros, angular velocity sensors, acceleration sensors or shock sensors etc.

The vibration compensation circuit 215 comprises an X signal processing circuit 215a, a Y signal processing circuit 215b, and a vibration calculating circuit 215c connected to outputs of these two signal processing circuits. The X signal processing circuit 215a is connected to as to receive input from the output of the vibration sensor X 214a, and processes X-axis direction vibration signals to provide output to the vibration calculating circuit 215c. Also, the Y signal processing circuit 215b is connected so as to receive input from the output of the vibration sensor Y 214b, and processes Y axis direction vibration signals to provide output to the vibration calculating circuit 215c. The vibration calculating circuit 215c calculates drive amounts required to eliminate vibration in the X-axis direction and Y axis direction respectively, and outputs to the shift mechanism drive circuit 216.

The shift mechanism drive circuit 216 comprises a driver 216a, a motor 361 as an X direction shift actuator, and a motor 357 as a Y direction shift actuator. These actuators correspond to the motor 361 and the motor 357 of FIG. 2A. The driver 216a respectively drives the X direction shift actuator 361 and the Y direction shift actuator 357.

The driver 216a is connected to as to receive as input the output of the vibration calculating circuit 215c of the vibration compensation circuit 215. Then, the driver 216a carries out a vibration compensation operation by performing drive control of the X direction shift actuator 361 and the Y direction shift actuator 357 in accordance with output of the vibration compensation circuit 215.

A vibration compensation operation start/stop control signal output from the body CPU 229 is applied to the vibration compensation circuit 215 via the input/output circuit 239. The vibration compensation circuit 215 then performs control to start and stop vibration compensation according to this control signal. If control for a vibration compensation operation starts, the vibration compensation circuit 215 outputs the control signal to the driver 216a of the shift mechanism drive circuit 216. Also, vibration compensation information based on the vibration compensation signal is output via the input/output circuit 239 to the image processing circuit 227 in order to perform an electronic vibration compensation operation. Incidentally, within this embodiment, as a vibration prevention function the image sensor 211 is moved based on output of the vibration sensor 214 for vibration detection, but this is not limiting, and it is also possible to eliminate vibration by moving part of the photographing lens.

Next, operation of the digital single lens reflex camera of a first embodiment will be described using the flowcharts shown in FIG. 4 to FIG. 8. First, if a power on reset is performed as a result of fitting power supply batteries in the camera body 200 or the like, initialization is performed (#1). At initialization the body CPU 229 performs a reset operation so as to initialize ports of respective ICs (integrated circuits) and memories, and also places machine components at initial positions. Next, the body CPU 229 detects the state of the power switch 257 (#3). If the result of detection is that the power switch 257 is in an off state, a standby state is entered where this step #3 is repeatedly executed.

If the result of detection in step #3 is that the power switch 257 is in an on state, the states of the various switches 255 such as the 1R switch, 2R switch, exposure mode switch, menu switch, display changing switch, and the states of the vibration mode switch 254, enlargement mode switch 256, enlargement position designation switch 258 and attachment switch 259 are detected by the switch detection circuit 253 (#5) Mode change processing such as exposure mode and quality mode is then carried out based on the states of the exposure mode switch and menu switch obtained by the switch detection (#7).

Next, it is determined whether or not live view display mode is active based on the state of switches linked to a display change button obtained by the switch detection of step #5 (#9). If the determination result is that live view mode has been set, processing advances to step #51 shown in FIG. 5 in order to switch from subject image observation using an optical viewfinder to subject image observation using live view display on the rear liquid crystal monitor 26, but this will be described in detail later.

If the determination result in step #9 is that live view display mode is not active the state of the 1R switch is determined based on the detection results obtained by the switch detection of step #5. If the result of determination is that the 1R switch is off, processing returns to step #3 and the steps described above are repeated.

If it is detected in step #11 that the 1R switch is on, namely that the photographer has pressed the release button down halfway, ranging and lens drive amount calculation detects defocus amount of the lenses 101 and 102 constituting the photographing lens using a well-known TTL phase difference method based on output from the ranging sensor 218 and the ranging circuit 219, and based on this a lens drive amount for driving to the in focus position is obtained by calculation (#13). Determination as to whether or not the subject is within a focused range is carried out based on defocus amount and lens drive amount (#15).

If the result of determination is that the subject is not within a focused range, the lens drive amount obtained in step #13 is sent to the lens CPU 111, and the lens drive mechanism 107 is controlled to drive the photographing lens to a focused position (#21). If the focusing operation is completed, processing returns to step #11, and the steps described above are repeated. Accordingly, in a state where live view display mode is not selected (that is, optical viewfinder observation mode is selected) and the 1R switch is pressed (exposure preparation state), the lens CPU 111 performs ranging and focus drive using the TTL phase difference method until focus is achieved. During this time, the subject image is viewed through the optical viewfinder, and the vibration compensation operation (vibration control operation) is not performed.

If the result of determination in step #15 is that the subject is in the focused range, the state of the 2R switch is detected (#17). In the case where the 2R switch is off, namely when the photographer has not pressed the release button down fully, the state of the 1R switch is detected (#19), and in the case where the 1R switch is on, processing returns to step #17, while if the 1R switch is off processing returns to step #3 and the above described steps are repeated. Specifically, in the case where the release button is in a fully pressed down state, a standby state is entered where steps #17 and #19 are repeated to perform detection, and if the photographer's finger is removed from the release button processing returns to step #3.

In this embodiment, in a state where the release button is pressed halfway and the R1 switch is on, automatic focusing adjustment is carried out using a TTL phase difference method in step #13, but a vibration compensation operation is not carried out. In this state, the subject image is observed using the optical viewfinder, and the fact that image disturbance due to vibration is particularly difficult to see, and drive of the mechanical vibration compensation mechanism significantly consumes the power supply batteries, means that wasting of the power supply more than necessary is prevented.

If it has been determined in step #17 that the 2R switch is on, processing transfers to an imaging operation to store a still image based on output of the image sensor 211. If the imaging operation is entered, first of all photometry and calculation of exposure amount are carried out (#31). In this step, measurement of the subject brightness is carried out based on the output of the photosensor 206, and calculation of exposure values is carried out to obtain shutter speed and/or aperture value calculation based on the subject brightness obtained here.

Next, a mechanical vibration compensation mechanism operation for preventing vibration of the subject image due to camera vibration is commenced (#33). Operation start of the mechanical vibration compensation mechanism is carried out by transmitting a vibration compensation operation start signal to the vibration compensation circuit 215 (refer to FIG. 3) by means of the input/output circuit 239, and in this way the motors 357 and 361 of the shift mechanism drive circuit 216 drive the image sensor 211 so as to eliminate vibration.

Next, an operation to raise the moving reflector mirror 201 is performed (#35). Before the moving reflector mirror 20 is raised up (namely in a down state), subject light flux that has passed through the lenses 101 and 102 of the photographing lens is reflected at the moving reflector mirror 201, and an image is formed on the focusing screen 203, and the subject image can be observed through the optical viewfinder. In this state, the subject light flux is not led to the image sensor 211, but can be directed to the image sensor 211 by raising the moving reflector mirror 201. Movement of the shutter 213 front curtain is then started, to place the shutter 213 is an open state (#37). The subject image is therefore formed on the image sensor 211, and exposure commences (#39).

Depending on the exposure mode set in step #7, if an exposure time corresponding to the set shutter speed or a shutter speed calculated in step #31 has elapsed, the rear curtain of the shutter 213 is moved to close the shutter (#41). Operations to lower the moving reflector mirror 201 and charge the shutter 213 are then performed (#43). Since this completes the exposure operation, operation of the mechanical vibration compensation mechanism is stopped (#45).

In this embodiment, with an exposure operation when observing a subject using the finder optical system, while steps #33 to #45 are being executed to acquire image data, the image sensor 211 is driven so as to eliminate the effects of vibration applied to the camera body using the mechanical vibration compensation mechanism comprised of the shift mechanism 217, shift mechanism drive circuit 216, vibration compensation circuit 215 and the vibration sensor 214. The vibration compensation mechanism can be operated before and after the exposure operation of step #39, for example, it can be started before photometry and exposure calculations, and operation then stopped after media storage, which will be described later.

Next, reading of image data from the image sensor 211 is performed (#47), image processing is carried out by the image processing circuit 227 etc. (#49), and a still image is stored in the storage medium 245 (#50). If storage of the still image is completed, processing returns to step #3 and the steps described above are repeated. As a result of the above described steps, when the subject image is observed using the optical finder, if the photographer presses the release button down fully the body CPU 229 stores image data that has been acquired by the image sensor 211 to the storage medium 245.

Figure 5:
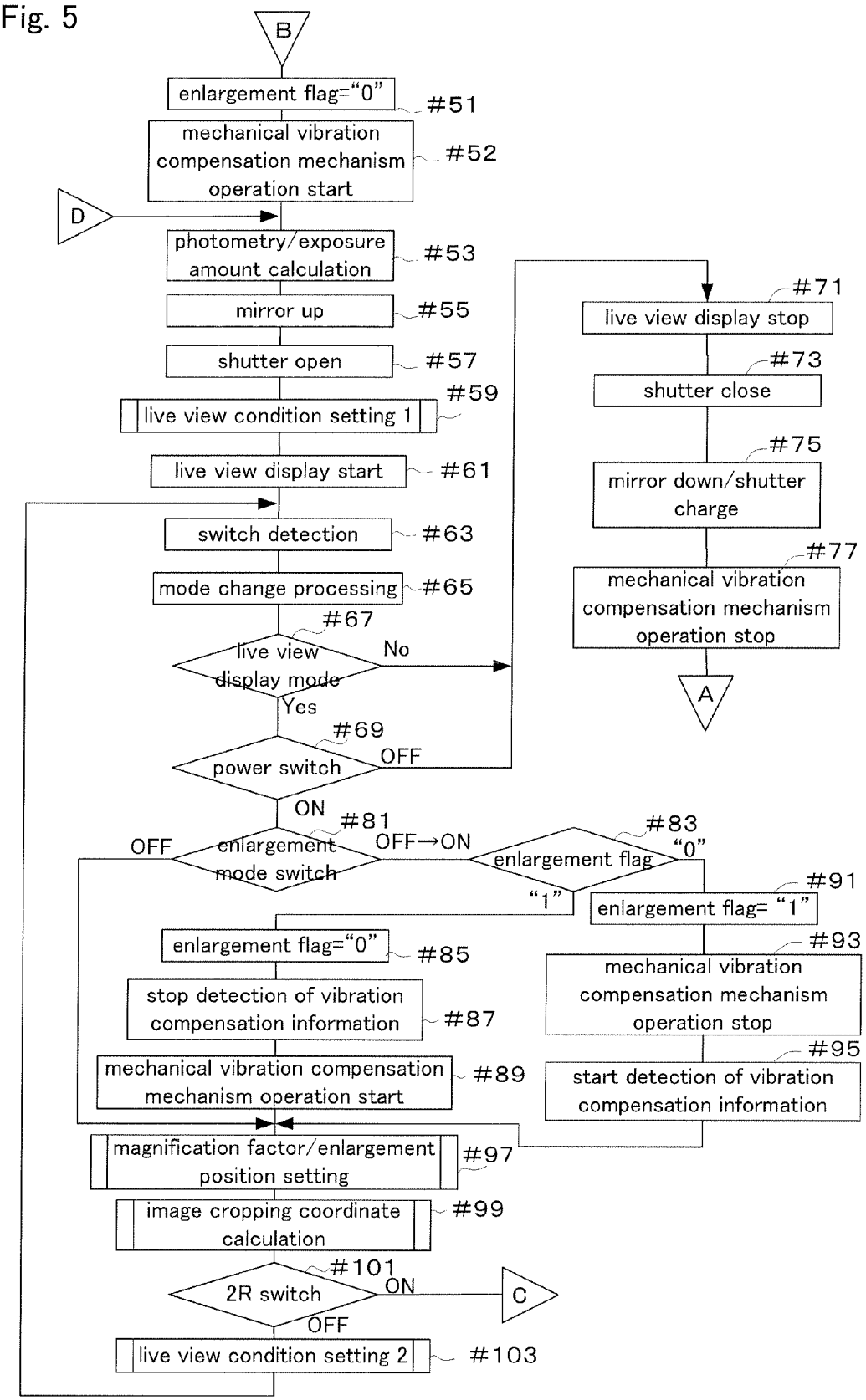
FIG. 5 is a flowchart showing power on reset in the first embodiment of the present invention.
Figure 6:
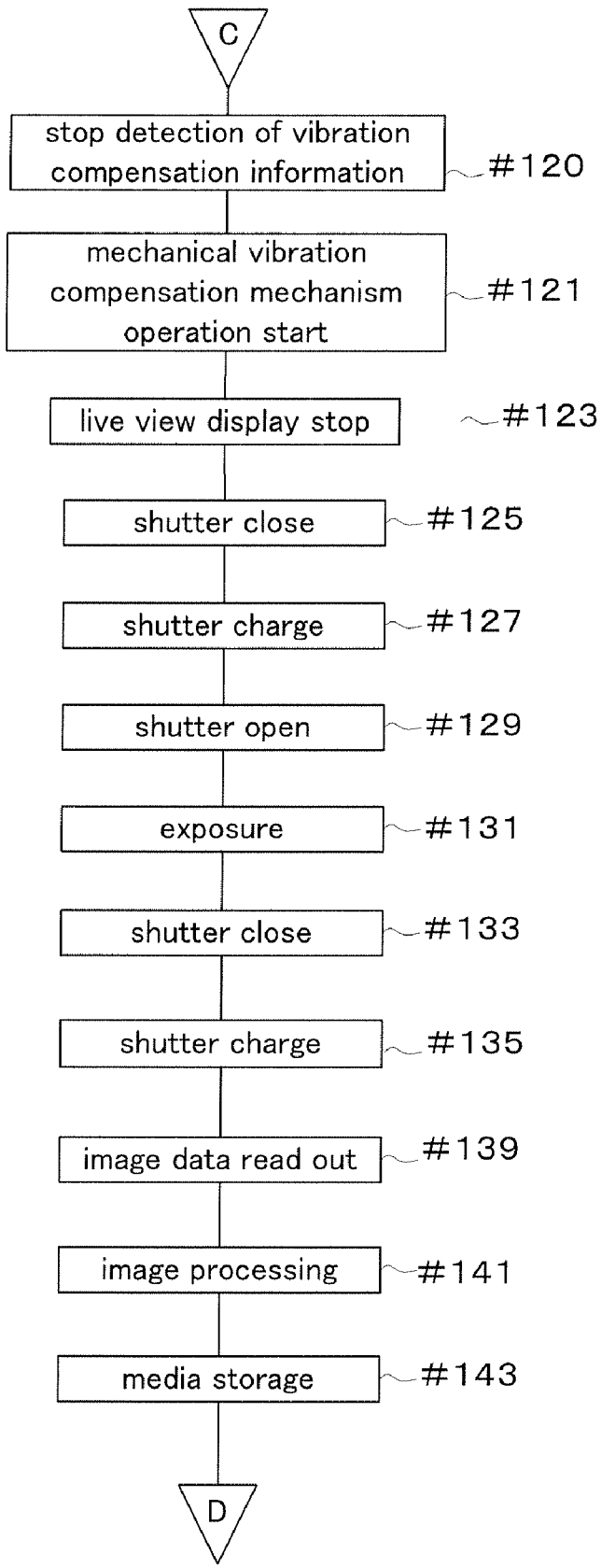
FIG. 6 is a flowchart showing power on reset in the first embodiment of the present invention.

Processing returns to step #9, and if live view display has been selected by operation of the display change button, processing advances to step #51 of FIG. 5 and an enlargement flag is set to "0" as a default value (#51). This enlargement flag is a flag indicating whether or not enlargement mode is set, and if the value of the flag is "0" enlargement mode is not set, while if the value is "1" enlargement mode has been set. Next, similarly to step #33, the mechanical vibration compensation mechanism operation is started (#52). In this embodiment, if the live view display mode is entered the vibration compensation is carried out using the mechanical vibration compensation mechanism. Therefore, when performing live view display on the liquid crystal monitor 26, even if there is vibration it is possible to reduce the effects of vibration using the mechanical vibration compensation mechanism.

Then, similarly to step #31, photometry and exposure amount calculation are performed (#53). Next, similarly to step #35, an operation to raise the moving reflector mirror 201 is performed (#55), and if the raising operation is completed an operation to open the shutter 213 is performed (#57), similarly to step #37. In this way, since the moving mirror reflector 201 is retracted from the exposure light axis and the shutter 213 is in an open state, a subject image is formed on the image sensor 211.

After that, in order to carry out condition setting for electronic shutter speed and sensitivity for driving the image sensor 211, a live view condition setting 1 subroutine (#59) is executed using the metering and exposure value calculation results obtained in step #53. By executing this sub-routine it is possible to display an image on the rear liquid crystal monitor 26 with appropriate brightness. If live view condition setting 1 is completed it is possible to prepare live view display, and live view display using a moving image of the subject image on the rear liquid crystal monitor 26 commences (#61). Within this embodiment, the frame rate of the live view display is 30 fps (frames per second), and the frame interval is 33 msec. Incidentally, the image processing circuit 227 controls the live view display operation by receiving this commencement instruction.

Similar to step #5, switch detection is then carried out (#63), and mode change processing is performed (#65), similar to step #7. Based on the display changing switch states acquired at the time of switch detection it is then determined whether or not the live view display mode is selected (#67), and if live view display mode is not selected, the live view display mode is rescinded and step #71 and later are executed in order to display the subject image using the optical viewfinder.

First, the live view display on the rear liquid crystal monitor 26 is stopped (#71), and then the shutter 213 is closed (#73), similar to step #41. In this way, the subject image is not guided onto the image sensor 211. Lowering of the moving reflector mirror 201 and shutter charge of the shutter 213 are then performed (#75). After that, similarly to step #45, the mechanical vibration compensation mechanism operation is stopped (#77). As a result of this series of operations, live view display is stopped, the mechanical vibration compensation operation is also stopped, processing returns to step #3, and the previously described steps are repeated.

Returning to step #67, if the result of determination is that live view display mode has been detected, the state of the power switch 257 is then detected (#69). If the result of determination is that the power switch 257 is off, processing advances to previously described step #71, and after carrying out rescindment of live view display etc. processing returns to step #3.

Returning to step #69, if the result of determination is that the power switch 257 is on, the state of the enlargement mode switch 258 is then detected (#81). If the result of determination is that there has been a state transition from off to on, the enlargement flag is interrogated (#83). If the result of interrogated is that the enlargement flag is "0", there has been a change from non-enlargement mode (same size mode) to enlargement mode, that is, the photographer has operated the enlargement mode switch 258 to enlarge the live view display, and so operation to enlarge the live view display is commenced.

First, the enlargement flag is set to "1" to indicate that enlargement mode has been set (#91). Next, in order to change the vibration compensation operation from one that uses the mechanical vibration compensation mechanism to electronic vibration compensation, first the mechanical vibration compensation mechanism operation is stopped by performing similar to step #45 (#93). Detection of vibration compensation information then commences (#95). This detection is commenced by vibration compensation information from the vibration compensation circuit 215 of FIG. 3 being input via the input/output circuit 239.

In step #83, if the enlargement flag is "1", there has been a change from enlargement mode to non-enlargement mode (same size mode), and so an operation is carried out to return the live view display to the same size. First, the enlargement flag is set to "0" to indicate that non-enlargement mode (same size mode) has been set (#85). Next, in order to change the vibration compensation operation from electronic vibration compensation to the mechanical vibration compensation mechanism operation, first the detection of vibration compensation information is stopped (#89), and then the mechanical vibration compensation mechanism operation is started (#89).

If the processing of step #89, or of step #95, is completed, or if a state transition has not been detected from off to on at the enlargement mode switch in step #81, a subroutine for setting magnification factor and enlargement position is executed (#97). This sub-routine is carried out to set a magnification factor for enlarged live view display, and an enlargement position, and will be described later using FIG. 7. Next, a subroutine for image cropping and coordinate calculation is executed (#99). This sub-routine performs calculation in order to determine a cropping position of the image in order to carry out enlarged display in the image processing circuit 227, but will be described in detail later using FIG. 8.

In this embodiment, if the live view display mode is entered the mechanical vibration compensation mechanism operation commences (#52), and since the mechanical vibration compensation mechanism is operating during live view display, live view with the effects of vibration alleviated is displayed, making it extremely easy to see. Also, if live view enlarged display mode is selected, the mechanical vibration compensation mechanism operation is stopped, and instead electronic vibration compensation is started. Therefore, in enlargement mode also, the effects of vibration are alleviated, making viewing extremely easy. Incidentally, in the enlargement mode, the reason electronic vibration compensation is being carried out is that it is necessary to perform calculation of cropping position in the image processing circuit 227 in order to give enlarged display, and when determining this cropping position it is possible to simply carry out enlarged display and vibration compensation by also taking into consideration the vibration compensation signal.

If the sub-routine for image cropping coordinate calculation in step #99 is completed, the state of the 2R switch is then detected (#101). If the result of determination is that the 2R switch is off, live view condition setting 2 is executed (#103). This live view condition setting 2 is a subroutine intended to appropriately maintain brightness of the live view display on the liquid crystal monitor 26. The live view condition setting 1 in step #59 is before live view display, and so is executed based on output of the photosensor 206, but with the live view condition setting 2, electronic shutter speed and sensitivity at the time of the next exposure are determined from a difference in screen brightness based on target brightness and the previous exposure results. Here, brightness is a value dependent on a weighted average value for each pixel output of the image sensor 211, for example. If the live view condition setting 2 subroutine is completed, processing returns to step #63 and the steps described above are repeated.

Processing returns to step "101, and if the 2R switch has been turned on during live view display, processing transfers to an imaging operation to store a still image based on output of the image sensor 211. If an exposure operation is entered, then first of all, if detection of vibration compensation information has been started in step #95 for electronic vibration compensation, the detection of vibration compensation information is stopped (#120). Next, if the operation of the mechanical vibration compensation mechanism has been stopped in step #93, then similar to step #33 the operation of the mechanical vibration compensation mechanism is started (#121). This is in order to prevent degradation due to vibration of the image if the camera vibrates.

Then live view displays top is carried out (#123), and the shutter 213 close operation (#125) and charge operation is carried out (#127). The shutter 213 is in an open state during live view display, but before entering an exposure operation by temporarily closing the shutter 213 that controls exposure time and performing charge, initialization of the shutter 213 is performed and exposure time control is made possible.

Movement of the shutter front curtain of the shutter 213 is then commenced and the shutter is opened (#129). In this way the subject image is formed on the image sensor 211, and exposure commences (#131). Depending on the exposure mode set in step #7 and #65, if an exposure time corresponding to the set shutter speed or a shutter speed obtained in the calculation of step #53 has elapsed, the rear curtain of the shutter 213 is moved to close the shutter (#133).

Then, a charge operation for the shutter 213 is carried out (#135). In live view display mode, because the moving reflector mirror 201 can be left raised up, the mirror lowering operation is not carried out, differing from the case of step #43. Incidentally, in the case of a camera of the type where the moving reflector mirror 201 and the shutter 213 can not be driven independently of one another, it is possible to lower the mirror here.

If the shutter charge is completed, image data is read out (#135), and image processing '#139) and media storage (#141) are carried out. These steps are similar to previously described steps #45, #47, #49 and #51 and so the details are omitted here. If media storage is completed, processing returns to step #53, and the camera operates in live view display mode.

Figure 7:
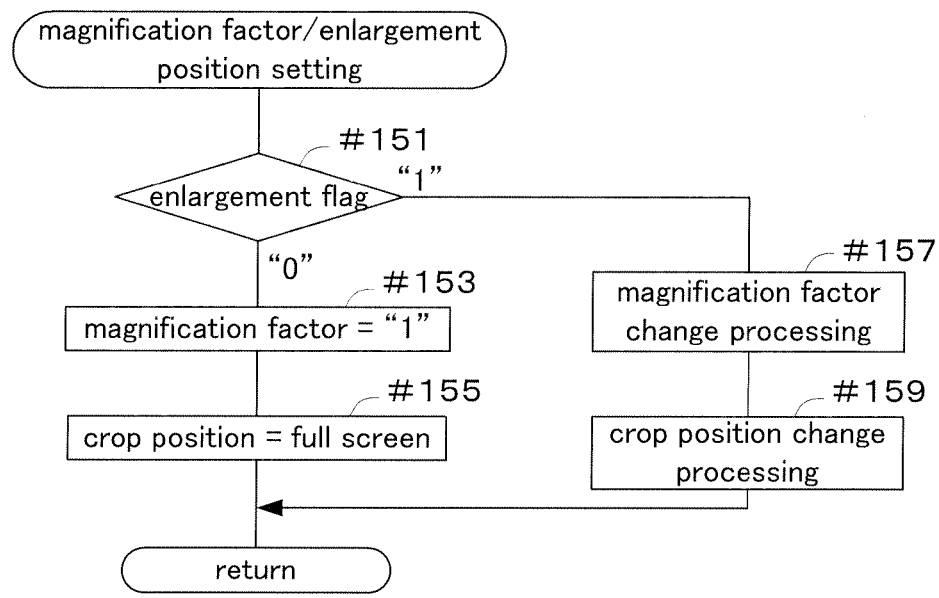
FIG. 7 is a flowchart of a subroutine for magnification factor and enlargement position setting of the first embodiment of the present invention.

Next, the sub-routine for the magnification factor and enlargement position setting of step #97 will be described using FIG. 7. If this subroutine is entered, first of all the enlargement flag is interrogated (#151). If the result of interrogation is that the enlargement flag is "0", non-enlargement mode (same size mode) is in effect, and so "1" is set as the magnification factor (#153). If the magnification factor is same size, the image processing circuit 227 can perform processing to as to be able to display the full screen, and so the cropping position is set to full screen (#155).

Returning to step #151, if the enlargement flag is "1", then enlargement mode is in effect and processing to change the magnification factor is carried out (#157) by using an operation dial or an operation button, not shown. It is possible to be able to set various magnification factors such as ×2, ×3, ×4, ×5, . . . ×10 etc. If magnification factor change processing is completed, cropping position change processing is then carried out (#159). Cropping position change processing is processing for determining a position that the photographer wants to enlarge, using the enlargement position designation switch 258. In menu mode etc., there is no problem in sharing the use of a cross-shaped button for respective item setting.

Figure 8:
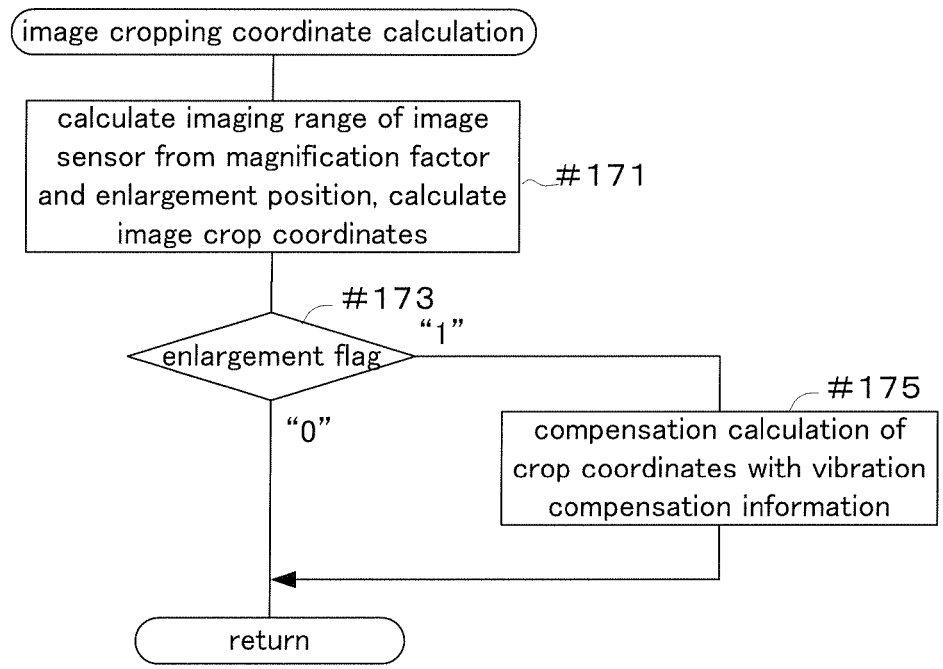
FIG. 8 is a flowchart of a subroutine for image cropping coordinate calculation of the first embodiment of the present invention.

Next, the sub-routine for the image cropping coordinate calculation of step #99 will be described using FIG. 8. If this subroutine is entered, first of all a cropping position for the image is calculated (#171). This calculation evaluates an image area from image data based on output of the image sensor 211, from magnification factor set in step #153 or step #157, and cropping position obtained in step #155 or step #159, and obtains coordinate positions where the image will be cropped by calculation.

Next, the enlargement flag is interrogated (#173), and if the result of interrogation is "1" indicating enlargement mode, correction calculation for the cropping position is carried out (#175). This correction calculation is to change the position of the cropping coordinates based on vibration compensation information output from the vibration compensation circuit 215 in order to prevent the effects of vibration, to give an image with vibration eliminated. If this correction calculation is completed, or if the enlargement flag is "0" in step #173, the original routine is returned to.

With the first embodiment of the present invention as described above, if the enlargement mode has been set an electronic vibration compensation operation is carried out, which means that it is possible to display live view with the effects of vibration alleviated on the rear liquid crystal monitor 26. Particularly in the case of enlargement mode, the effects of vibration are amplified and picture quality is degraded, but since vibration compensation is carried out it is possible to eliminate this drawback. Also, since electronic vibration compensation reduces vibration by image processing, power consumption is also reduced compared to a mechanical vibration compensation mechanism.

Also, enlarged display for live view display is carried out by performing cropping of an enlarged portion from an original image using image processing, and so this cropping position is changed using a vibration compensation signal. Therefore, in image processing there is only addition of some of the steps of vibration compensation processing and there is no increase in cost.

Further, in this embodiment, in the case where non-enlargement mode (same size mode) has been set, the mechanical vibration compensation mechanism is operated, and so at the time of live view display there will be no cropping of the image at the top, bottom or right and left depending on cropping amount. It is also possible to have live view display of an image with the effects of vibration reduced.

Incidentally, in this embodiment, magnification factor is changed, but this is not limiting and it is also possible to have only one magnification factor, and in the case of enlarged display to carry out enlarged display of live view with a specified magnification. It is also possible for operating members for magnification factor changing to be shared with zoom operation members.

Figure 9:
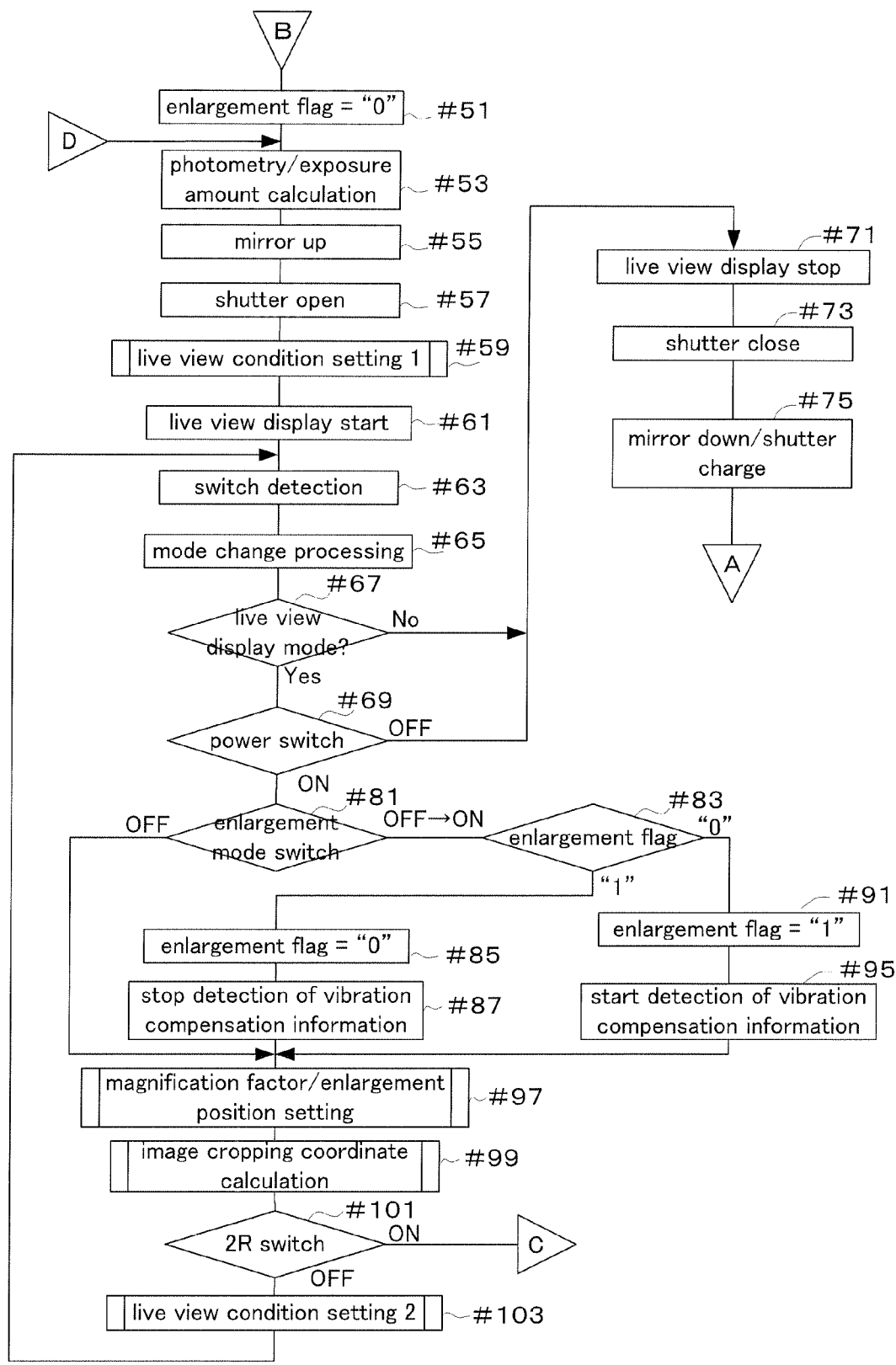
FIG. 9 is a flowchart showing power on reset in a second embodiment of the present invention.

Next, a second embodiment of the present invention will be described using FIG. 9. Within the first embodiment, the organization of the vibration compensation is that if the live view display mode is entered the mechanical vibration compensation mechanism is operated, while if enlarged mode is entered electronic vibration compensation is in effect. Within the second embodiment, electronic vibration compensation is carried out only when enlargement mode is entered, and in the case of live view display for non-enlargement mode (same size mode) vibration compensation is not carried out. In the case of enlargement mode, vibration is magnified on the display degrading picture quality, but in the case of same size mode, in a comparative case, the vibration was not all that significant, and so there was no significant disadvantage even if vibration compensation was omitted.

The structure of the second embodiment is the structure of the first embodiment, but with the mechanical vibration compensation mechanism operation start of steps #52 and #89 in the flowchart shown in FIG. 5 omitted, and other than the omission of the vibration compensation mechanism operation stop of steps #77 and #93 is the same, and so detailed description is omitted.

Within the second embodiment, in the case where live view display mode is entered there is no mechanical vibration compensation operation, but in the case of enlargement mode (OFF to ON in #81), at the time of enlarged display image cropping is carried out using vibration compensation information (#93, #175) and so electronic vibration compensation is active, and it is possible to live view display an image with reduced vibration. Also, since electronic vibration compensation can reduce the effects of vibration by image processing, power consumption is also reduced.

Incidentally, if the mechanical vibration compensation mechanism is not used and the shift mechanism 217 is also not used even as a dust reduction function, it is possible to omit the shift mechanism 217, shift mechanism drive circuit 216 etc. making it possible to reduce the overall cost, and enabling a reduction in size.

As described above, within each of the embodiments of the present invention, at the time of carrying out enlargement display at the time of live view display, vibration compensation information is used to change an image cropping position according to enlargement position, and together with performing enlargement display it is possible to display with an image that has been subjected to vibration compensation. As a result, power consumption is reduced, and it is possible to carry out live view display with reduced vibration, which is extremely convenient.

Within each of the embodiments, a mechanical vibration compensation mechanism comprises a vibration compensation circuit 215, a shift mechanism drive circuit 215, and a shift mechanism 217, with the effects of vibration being eliminated by moving the image sensor 211 based on output of a vibration sensor 214. However, this is not limiting and it is also possible to have a configuration where the effects of vibration are eliminated by moving lenses 101 and 102, for example, within a plane orthogonal to the optical axis.

With the description of the embodiments of the present invention, an example of a digital single lens reflex camera has been given, but this is not limiting and it is also possible to apply the invention to a compact digital camera having a vibration compensation (vibration prevention) function and a live view display function, or an electronic image taking device such as a mobile telephone.

What is claimed is:

1. A digital camera, comprising:
an image sensor for acquiring subject images via a photographing lens;
an image processing circuit, repeatedly input with a subject image signal acquired by the image sensor, for cropping all or part of the subject image signal, enlarging, and outputting as image data;
a display element for displaying the image data output by the image processing circuit enlarged or compressed;
a vibration sensor for detecting vibration of the digital camera;
a vibration compensation circuit for calculating at least one of vibration direction and vibration amount according to output of the vibration sensor;
a shift mechanism for moving the image sensor or part of the photographing lens;
a designation member for designating a position and magnification factor of an image displayed by the display element; and
a control circuit for,
in the case where the magnification factor is greater than 1, designating the position and size for cropping the subject image signal by the image processing circuit according to calculated results of the vibration compensation circuit, and
in the case where the magnification factor is equal to 1, instructing the shift mechanism to move the image sensor or part of the photographing lens according to the calculated results of the vibration compensation circuit.

2. The digital camera of claim 1, wherein:
the shift mechanism moves the image sensor or part of the photographing lens along a surface orthogonal to the optical axis of the photographing lens.

3. A digital camera control method for repeatedly imaging a subject image, and displaying a moving image, comprising the steps of:
acquiring the subject image on an image sensor via a photographing lens;
cropping part of the moving image, and performing enlarged display or displaying whole of the moving image;
detecting vibration applied to the digital camera;
receiving a magnification factor of the moving image; and
when the magnification factor is greater than 1, changing the cropping position for the enlarged display according to results of vibration detection, and when the magnification factor is equal to 1, shifting the image sensor or part of the photographing lens according to the results of vibration detection.

4. A non-transitory computer-readable medium storing a computer program for digital camera which repeatedly images a subject image and displays a moving image, the instructions comprising:
acquiring the subject image on an image sensor via a photographing lens;
cropping a position of the moving image, and performing enlarged display or displaying whole of the moving image;
detecting vibration applied to the camera;
receiving a magnification factor of the moving image;
when the magnification factor is greater than 1, changing the cropping position for the enlarged display according to results of vibration detection, and when the magnification factor is equal to 1, shifting the image sensor or part of the photographing lens according to the results of vibration detection.

5. A digital camera, comprising:
- an image sensor for acquiring a subject image via a photographing lens;
- a live view display section for repeatedly imaging the subject image, cropping and enlarging part of the subject image, and displaying as a moving image;
- a vibration detection section for detecting vibration of the digital camera and calculating at least one of vibration direction and vibration amount;
- a shift mechanism for moving the image sensor or a part of the photographing lens;
- a designation member for designating a position and magnification factor of an image displayed on the live view display section; and
- a control section for
  - in the case where the magnification factor is greater than 1, controlling a crop position and size of the image displayed on the live view display section according to an output of the vibration detection section, and
  - in the case where the magnification factor is equal to 1, instructing the shift mechanism to move the image sensor or part of the photographing lens according to the output of the vibration detection section.

* * * * *